United States Patent [19]

Reichle

[11] Patent Number: 4,679,231

[45] Date of Patent: Jul. 7, 1987

[54] TELEPHONE ACCESSORY HOUSING

[75] Inventor: Hans Reichle, Wetzikon, Switzerland

[73] Assignee: Reichle + De Massari AG Elektroingenieure, Wetzikon, Switzerland

[21] Appl. No.: 771,285

[22] Filed: Aug. 30, 1985

[30] Foreign Application Priority Data

Sep. 5, 1984 [CH] Switzerland ............... 4230/84

[51] Int. Cl.$^4$ ............................................. H04M 1/00
[52] U.S. Cl. ................................. 379/396; 379/429; 379/376
[58] Field of Search ............... 179/84 L, 84 R, 81 R, 179/179, 99 LS, 81 C; 361/394, 395, 399; 200/310, 311, 317

[56] References Cited

U.S. PATENT DOCUMENTS 2,616,972 11/1952 McNutt ........................ 379/442
4,353,109 10/1982 Weber ........................... 361/399
4,578,542 3/1986 Alderman ..................... 379/376

Primary Examiner—James L. Dwyer
Attorney, Agent, or Firm—Karl F. Ross; Herbert Dubno

[57] ABSTRACT

A casing for an auxiliary device to optically display an incoming telephone call includes a bottom portion which is detachably connected to a cover portion. Accommodated in the so-formed interior space is a frame which carries a plurality of reflectors spaced along its periphery and reflecting the light towards the outside through a viewing window of the cover portion. For supporting a print card within the interior space, the frame is provided with inwardly projecting clamps each of which having two shanks to hold the print card therebetween.

7 Claims, 3 Drawing Figures

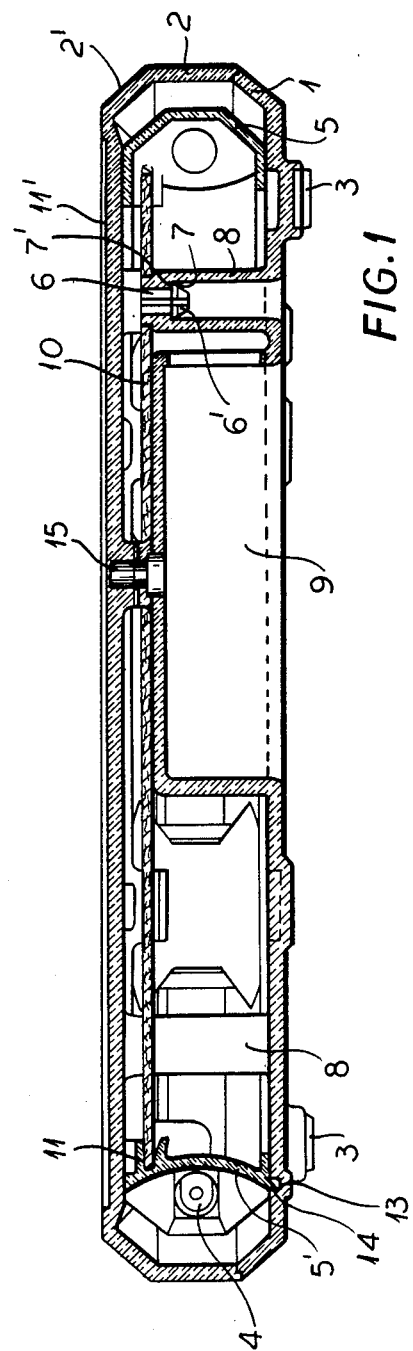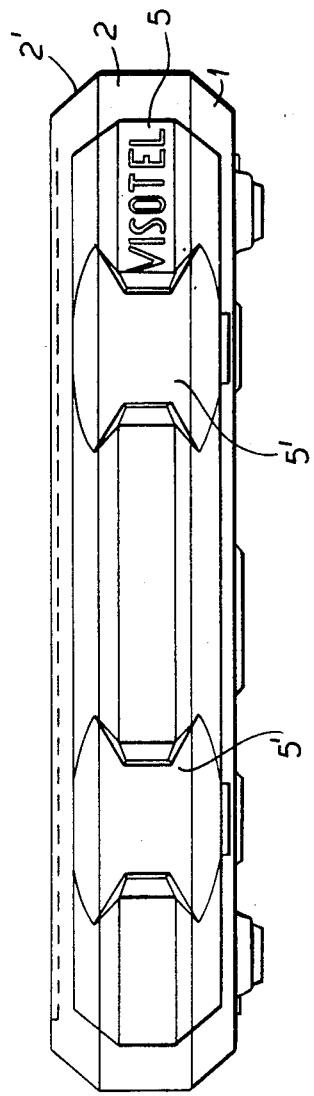

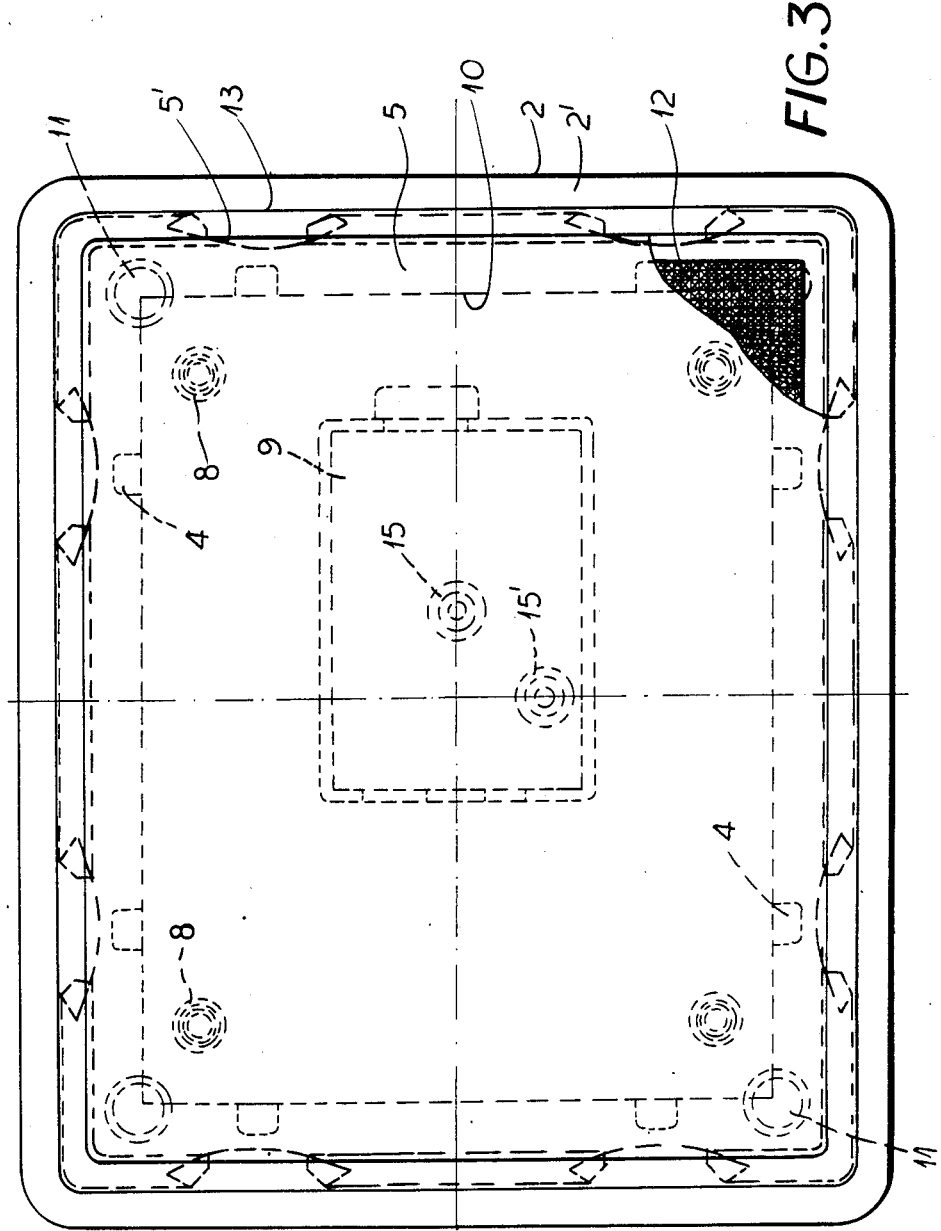

TELEPHONE ACCESSORY HOUSING

FIELD OF THE INVENTION

My present invention relates to a telephone accessory housing or casing, especially a box-like casing, of an auxiliary device for a telephone to optically display an incoming call.

BACKGROUND OF THE INVENTION

A telephone accessory casing for optically signaling the advent of a telephone call can be provided with a plurality of lamp sockets for accommodating respective lamps where illumination is effective through transparent areas of the casing. Arranged within the casing is a print card, i.e. a printed circuit board, which contains the electric switches, circuitry and connections.

Such telephone accessories have been offered under the trade name "VISOTEL" (see U.S. Pat. No. 4,301,335) so as to optically or visually display the reception of an incoming call by a traveling light. Such a device is especially of advantage for individuals with impaired hearing but also in the event the ringing of the telephone cannot be heard because of other noises. Thus such telephone accessories have found widespread interest and have developed into a mass product.

The telephone accessories of this type offered so far have the disadvantage that their housings are not suitable for easy and inexpensive assembly and disassembly and thus do not allow as effective a mass production as one would like. Moreover, their visual and esthetic appearance may not meet customers approval in some cases.

OBJECT OF THE INVENTION

It is thus the principal object to provide an improved casing of an auxiliary device for optically displaying an incoming telephone call, i.e. a call-signaling telephone accessory, obviating the afore-stated drawbacks.

SUMMARY OF THE INVENTION

I realize this object according to the present invention by providing a bottom portion which is detachably connected to a cover portion so that an interior space is defined in which a frame is accommodated. The frame is provided along its periphery with a plurality of reflectors which reflect impinging light beams towards the outside, and further includes a plurality of clamps which are connected to the frame for supporting a print card within said interior space.

The connection between the cover and the bottom is provided via snaps which are easily detachable.

According to the invention, these snaps are obtained by providing the bottom with a plurality of upright support posts each of which having an inwardly directed shoulder cooperating with a yielding snap pin which projects downwardly from the cover. During assembly of the cover portion onto the bottom portion the snap pins protrude into the posts and snap against the shoulders. Preferably, at least the cover is made of transparent plastic material and includes an oblique area which serves as a viewing window for the reflectors.

The clamps for supporting the print card or printed circuit board in a secure manner within the interior project inwardly from the frame and are of U-shape so as to squeeze the print card between the formed shanks.

In order to provide an attractive appearance of the casing, the bottom portion extends inwardly at a central area to allow the connections to the print card to be invisible.

The advantage of the present invention resides in the fact that the casing that is the cover portion and the bottom portion as well as the frame and the print card can be assembled in a very simple manner without necessitating any screws so that all criteria are met for a mass product with an attractive styling and reliability in operation. Further, the use of reflectors allows an optimal light efficiency in cooperation with the transparent casing portions.

BRIEF DESCRIPTION OF THE DRAWING

The above and other objects, features and advantages of my present invention will become more readily apparent from the following description, reference being made to the accompanying drawing in which:

FIG. 1 is a cross sectional view of a casing according to the invention illustrating the longer side thereof;

FIG. 2 is a side view of the casing illustrating the shorter side thereof; and

FIG. 3 is a top view of the casing partly broken away.

SPECIFIC DESCRIPTION

In the drawing, I have shown a casing of an auxiliary device for a telephone (not shown) to provide a visual indication of an incoming telephone call. The casing includes a shell-shaped bottom portion 1 which is detachably connectable to a shell-shaped cover portion 2 to give the casing a relatively flat and box-like appearance.

In the present embodiment, the bottom 1 is integrally connected with a plurality of upright cylindrical support posts 8 which are located in vicinity of each corner of the casing and support the cover 2 when the latter is attached to the bottom 1. Each post 2 is provided with an inwardly directed upper top 7 so as to define an annular internal shoulder 7. Cooperating with each shoulder 7 is a snap pin 6 which projects from the underside of the cover 2 towards the support posts 8. Each snap pin 6 is made of a yielding material and is provided with a truncated-cone shaped head 6. During assembly of the casing, the cover 2 need only be pressed onto the bottom 1 until the snap pins 6 protrude into the associated posts 8 and snap with their head 6 against the shoulder 7. Due to the yielding properties of the snap pins 6, the cover 2 can be separated from the bottom as easily by simply lifting the cover 2 until the snap pins 6 disengage with their head from the shoulders 7. Thus, the so-formed snaps allow an easy assembling and disassembling of the casing.

To prevent the telephone from sliding when placed on the casing, the upper or support surface of the cover 2 is lined with a nonskid coating 12 as indicated in FIG. 3. Moreover, the support surface extends at a lower level so as to be surrounded by an upwardly projecting edge 11 of the cover 2. Consequently, the telephone is also prevented from slipping off the edge of the casing.

As shown in the drawing, the bottom 1 is provided with footings 3 to allow the casing to be placed securely on a surface. I may note, however, that the casing may also be fastened to a wall by suitable attachments which are, however, not shown in detail.

Preferably, the bottom 1 and the cover 2 are made of transparent material to allow radiation to pass through the casing. In addition, the cover 2 is provided with an oblique area 2 which extends around the cover 2 to serve as viewing window 16 as will be described hereinbelow.

Encased by the bottom 1 and the cover 2 is an internal frame 5 which is provided with a plurality of reflectors 5 spaced along the periphery of the frame 5. Cooperating with each reflector 5 is at least one lamp (not shown) inserted in a lamp socket 4 so that the reflectors 5 reflect the light generated by the lamp towards the outside through the viewing window 16. The curvature of the reflectors 5 with respect to the surrounding casing can either be symmetrical or may be asymmetrical towards the viewing window 16. The frame 5 can be made of several sections. It is preferred to compose the frame 5 of 4 sections which are each provided with a projecting lower edge 14 engaging in a respective groove 13 of the bottom 1.

The frame 5 is advantageously made of reflecting material or at least provided with a reflecting layer along the area of the reflectors 5.

To allow a print card 10 to be securely fixed inside the casing, the frame 5 is integrally provided with a plurality of clamps 11 which project inwardly towards the interior of the casing and retain the print card 10 inbetween their superimposed shanks as I have shown in FIG. 1. In order to provide an optimal visual and esthetic appearance of the casing, the connections to the print card 10 are preferably arranged in an invisible manner. Accordingly, the bottom 1 extends inwardly along a central area of the casing to define a compartment 9 which is open towards the outside. Thus, the connections are not exposed and in addition, the print card 10 is further supported by the facing inner wall of the compartment 9.

To allow the snap pins 6 to project into the support posts 8 when assembling the casing, the print card 10 is provided with respective through holes through which the pins 6 can pass which thus further support the print card 10 in their position within the interior of the casing. The snap pins 6 project from bosses of the cover 2 defining shoulders against which the printed circuit board 10 can rest being sandwiched between the shoulders and the ends of the posts 8.

In addition to the described snaps, the cover 2 and the bottom 1 can be further securely attached to each other by a screw 15, e.g. a seal screw which is inserted into aligned threaded boreholes of the cover 2 and in the innerwall of the compartment 9 of the bottom 1. A second screw 15 may be provided in order to additionally secure the attachment of the cover 2 to the bottom 1 along both coordinations.

I claim:

1. A casing for a telephone accessory for optically displaying a signal representing an incoming call, comprising:
   a bottom portion;
   a cover portion;
   connecting means for detachably fastening said cover portion to said bottom portion so that upon connecting said cover portion and said bottom portion an interior space is defined;
   a frame accommodated within said interior space;
   optical means connected to said frame for supporting a circuit-carrying print card within said interior space, said cover portion being provided around its periphery with an oblique surface which serves as a viewing window aligned with said optical means.

2. A casing as defined in claim 1 wherein said reflectors have a curvature which is symmetrical with respect to said cover portion.

3. A casing as defined in claim 1 wherein said reflectors have a curvature which is asymmetrical towards said viewing window.

4. A casing for a telephone accessory for optically displaying a signal representing an incoming call, comprising:
   a bottom portion;
   a cover portion;
   connecting means for detachably fastening said cover portion to said bottom portion so that upon connecting said cover portion and said bottom portion an interior space is defined;
   a frame accommodated within said interior space;
   optical means connected to said frame and reflecting impinging light beams towards the outside; and
   clamping means connected to said frame for supporting a circuit-carrying print card within said interior space, said cover portion having an upper surface which extends at a lower level so as to be surrounded by an upwardly projecting peripheral edge.

5. A casing for a telephone accessory for optically displaying a signal representing an incoming call, comprising:
   a bottom portion;
   a cover portion;
   connecting means for detachably fastening said cover portion to said bottom portion so that upon connecting said cover portion and said bottom portion an interior space is defined;
   a frame accommodated within said interior space;
   optical means connected to said frame and reflecting impinging light beams towards the outside; and
   clamping means connected to said frame for supporting a circuit-carrying print card within said interior space, said cover portion having an upper surface provided with an antiskid coating.

6. A casing for a telephone accessory for optically displaying a signal representing an incoming call, comprising:
   a bottom portion;
   a cover portion;
   connecting means for detachably fasteneing said cover portion to said bottom portion so that upon connecting said cover portion and said bottom portion an interior space is defined;
   a frame accommodated within said interior space;
   optical means connected to said frame and reflecting impinging light beams towards the outside; and
   clamping means connected to said frame for supporting a circuit-carrying print card within said interior space, said connecting means including a plurality of upright support posts connected to said bottom portion and supporting said cover portion, each of said support posts defining an inner shoulder at a distance to said bottom portion, and a plurality of snap pins projecting downwardly from said cover portion so that, upon connecting said cover portion with said bottom portion, said snap pins protrude into said support posts until snapping again said inner shoulders, said card being braced between bosses from which said snap pins project and ends of said posts, said bottom portion and said cover portion being each shell-shaped to give the casing a box-like appearance, and said cover portion having an upper surface which extends at a lower level so as to be surrounded by an upwardly projecting peripheral edge.

7. A casing as defined in claim 6 wherein said clamping means includes a plurality of inwardly projecting clamps defining two shanks between which said print card is retained.

* * * * *